United States Patent
Pierson et al.

(10) Patent No.: US 12,241,657 B2
(45) Date of Patent: Mar. 4, 2025

(54) POLYCARBONATE SOLAR WATER HEATER

(71) Applicant: WiSys Technology Foundation, Inc., Madison, WI (US)

(72) Inventors: Kim Pierson, Eau Claire, WI (US); Rebecca Tollakson, Jr., Mahomet, IL (US)

(*) Notice: Subject to any disclaimer, the term of this patent is extended or adjusted under 35 U.S.C. 154(b) by 387 days.

(21) Appl. No.: 17/731,421

(22) Filed: Apr. 28, 2022

(65) Prior Publication Data
US 2022/0349624 A1 Nov. 3, 2022

Related U.S. Application Data (60) Provisional application No. 63/180,934, filed on Apr. 28, 2021.

(51) Int. Cl.
| | | |
|---|---|---|
| *F24S 10/50* | (2018.01) | |
| *F24S 70/14* | (2018.01) | |
| *F24S 80/00* | (2018.01) | |
| *F24S 80/30* | (2018.01) | |
| *F24S 80/40* | (2018.01) | |

(52) U.S. Cl.
CPC ........... *F24S 10/502* (2018.05); *F24S 10/501* (2018.05); *F24S 70/14* (2018.05); *F24S 80/30* (2018.05); *F24S 2080/05* (2018.05); *F24S 80/40* (2018.05)

(58) Field of Classification Search
CPC ........ F24S 10/502; F24S 10/501; F24S 80/30; F24S 80/40; F24S 70/14; F24S 2080/05
USPC .................................................. 126/651–577
See application file for complete search history.

(56) References Cited

U.S. PATENT DOCUMENTS

| | | | | |
|---|---|---|---|---|
| 2,872,915 A | * | 2/1959 | Bowen | F24S 30/425 126/573 |
| 3,934,323 A | * | 1/1976 | Ford | B29C 66/5326 156/251 |
| 4,150,720 A | * | 4/1979 | Brackman | F24S 10/502 165/170 |

(Continued)

FOREIGN PATENT DOCUMENTS

| | | |
|---|---|---|
| CN | 104567023 | 4/2015 |
| WO | 01/67008 | 9/2001 |

OTHER PUBLICATIONS

Schoeneberger et al., "Solar for Industrial Process Heat: A Review of Technologies, Analysis Approaches, and Potential Applications in the United States", Energy 206 (2020) 118083.

(Continued)

*Primary Examiner* — Vivek K Shirsat
(74) *Attorney, Agent, or Firm* — Boyle Fredrickson, S.C.

(57) ABSTRACT

A solar water heater absorber absorbs the sun's energy on the surface of a twin-walled polycarbonate panel and conducts the heat from the sun through the panel wall into fluid flow through channels of the panel. The panel is an extruded polycarbonate glazing material that consists of two panes connected by longitudinal ribs to form a plurality of water channels that may further include twisted strips providing a helical water flow pattern that increases turbulence within the water channels. The panel is connected to large pipes or headers on the top and bottom ends of the panel that receive the heated fluid from the water channels, allow the heated fluid to exit the panel, and for return water to re-enter the panel in a solar water heating system.

17 Claims, 4 Drawing Sheets

(56) References Cited

U.S. PATENT DOCUMENTS

| | | | |
|---|---|---|---|
| 4,279,244 A | 7/1981 | McAlister | |
| 4,426,999 A | 1/1984 | Evans et al. | |
| 6,487,768 B2 | 12/2002 | Rhodes | |
| 8,096,295 B1 | 1/2012 | Eyal | |
| 2016/0025381 A1* | 1/2016 | Luftglass | F24S 80/457 |
| | | | 126/646 |

OTHER PUBLICATIONS

Hudon et al., "Low-Cost Solar Water Heating Research and Development Roadmap", Technical Report Aug. 2012.
ICC 901/SRCC 100—2020 Solar Thermal Collector Standard.
Guide to Standard ISO 9806: 2017—Version 1.0; Oct. 26, 2017.

* cited by examiner

POLYCARBONATE SOLAR WATER HEATER

CROSS REFERENCE TO RELATED APPLICATION

This application claims the benefit of U.S. provisional application 63/180,934 filed Apr. 28, 2021 and hereby incorporated by reference.

STATEMENT REGARDING FEDERALLY SPONSORED RESEARCH OR DEVELOPMENT

--

BACKGROUND OF THE INVENTION

The present invention relates generally to solar water heater systems and, in particular, to a polycarbonate solar heat absorber panel.

There is an increased desire to reduce the use of fossil fuels. Solar power is growing rapidly as a global source of renewable energy.

Water heaters typically use large amounts of fossil fuels in the form of natural gas, heating oil, propane, liquefied petroleum gas, solid fuels, etc. Solar water heaters are a clean energy alternative that are used to reduce the need for grid power, reduce the costs of heating water, and can be used to heat homes. Solar water heater systems absorb the sun's energy on a specifically designed solar thermal collector. The energy is then transferred to a heat transfer fluid (which may be, e.g., water or an antifreeze-water mixture) inside the solar thermal collector. The heated transfer fluid flows into a storage tank (direct system) or through a heat exchanger coil where heat is transferred into stored water in a storage tank (indirect system), and then the heat transfer fluid flows back into the solar thermal collector to repeat the process.

Designs for solar thermal collectors may involve a simple tempered glass topped insulated box with a flat plate solar absorber inside the box receiving the sun's energy. The flat plate solar absorber may be plates made of sheet metal attached to copper heat exchanger pipes which absorb the heat from the sheet metal. In one embodiment, the sheet metal may include copper fins that absorb the sun's energy and are connected to a parallel arrangement of smaller copper heat flow tubes, known as "risers", which are further connected to inlet and outlet copper pipes, known as "headers", at the top and bottom ends of the smaller heat flow tubes to receive and conduct the heater fluid. The heat transfer fluid flows through the smaller heat flow tubes and larger pipes of the flat plate solar absorber to the copper heat exchanger pipes of a storage tank to heat water stored in a storage tank for further use.

Copper is a commonly used material for solar thermal collectors because of its high heat conductivity, sealing and joining ability by soldering, and mechanical strength. Expensive sunlight absorber coatings may be used on the copper sheet metal to enhance heat absorption and aluminum sheets may be used below the sheet metal to reflect sunrays back onto the sheet metal for absorption.

However, copper fin solar water heaters are expensive and prone to component failures. Therefore, adoption of this solar power technology has been slow.

SUMMARY OF THE INVENTION

The present invention absorbs the sun's energy on the surface of a twin-walled polycarbonate panel and conducts the heat from the sun through the panel wall into fluid flow through channels of the panel. The panel is an extruded polycarbonate glazing material that consists of two panes connected by longitudinal ribs to form a plurality of water channels that may further include twisted strips providing a helical water flow pattern that increases turbulence within the water channels. The panel is connected to large pipes or headers on the top and bottom ends of the panel that receive the heated fluid from the water channels, allow the heated fluid to exit the panel, and for return water to re-enter the panel in a solar water heating system.

In use, sunlight hits the front wall of the twin-walled polycarbonate panel and transfers the sun's energy to the polycarbonate material of the front wall which transfers the sun's energy to heat transfer fluid flowing through the water channels of the panel. The hot heat transfer fluid flows into the upper pipe or header of the panel which is further coupled to a water storage tank and optionally a heat exchanger within the tank. The volume of hot fluid within the water storage tank may be used directly as hot water or may be used to assist with heating the environment or home. An electric pump may be used to circulate return heat transfer fluid back into the panel through the lower piper or header and upwards through the panel to be heated.

It is thus one feature of one embodiment of the present invention to reduce the distance in which the heat must be conducted through the panel to reach the heat transfer fluid. Normally the heat must travel a long distance through the copper fin panels to reach the risers.

It is thus one feature of one embodiment of the present invention to provide flat heat absorbing panels with good heat transmittance, high impact resistance, good temperature capability (at least 270° F.), low transmittance in the long wave infrared reducing heat loss, less heat loss due to the insulating effect of multiple layers, and less leaks by water freezing problems. The panels may emit infrared as efficiently as it absorbs it but may also be a "selective absorber" which emits less infrared than it absorbs and therefore increases efficiency.

It is thus one feature of one embodiment of the present invention to use conductive materials that are non-corrosive, lightweight, low cost, and readily available. Polycarbonate materials are good alternatives to copper and aluminum.

Specifically, one embodiment of the present invention provides a solar heat absorber for absorbing heat and transferring heat from the sun to a heat exchanger having a heat absorber panel having front and rear plates wherein the front plate supports an absorbent sun contact surface and the rear plate supports a reflective surface; a plurality of ribs extending between the front and rear plates and forming longitudinal channels flanked by the front and rear plates extending along a longitudinal axis wherein the plurality of channels permits a flow of fluid along the longitudinal axis; an upper header communicating with the heat absorber panel and configured to receive fluid from the plurality of channels wherein a connection between the upper header and the heat absorber panel is an upper interlocking joint; and a lower header positioned below the upper header and communicating with the heat absorber panel and configured to transfer fluid to the plurality of channels; wherein a connection between the lower header and the heat absorber panel is a lower interlocking joint; wherein the upper and lower header provide H-shaped slots receiving upper and lower edges, respectively, of the heat absorber panel.

It is thus a feature of at least one embodiment of the invention to provide an improved sealing engagement between the heat absorber panel and the upper and lower tubular conduits receiving and delivering the heat transfer fluid.

A pair of lateral collars may extend over outer ends of the upper header and lower header, respectively, and further comprise slots corresponding with outer ends of the H-shaped slot of the upper and lower headers.

It is thus a feature of at least one embodiment of the invention to reinforce the interlocking engagement of the upper and lower headers with the heat absorber panel at the H-shaped joint to provide stronger engagement. In some embodiment, the heat absorber panel is polycarbonate adhesive bonded to the upper and lower headers and "leak tested" before the pair of lateral collars are added and subsequently bonded to the header pipes and heat absorber panel. The interlocking collars provide a double layer of structural and air-tight sealing support.

At least one spacer block may be positioned within a channel of the plurality of channels positioned at outer edges of the heat absorber panel.

It is thus a feature of at least one embodiment of the invention to provide inner structural support and outwardly extending force on the inside of the channel interfacing with the H-shaped joint.

The upper and lower interlocking joint plus the spacer block may be structurally bonded and air-tight sealed using a polycarbonate adhesive.

It is thus a feature of at least one embodiment of the invention to structurally bond and air-tight seal the heat absorber panel and the upper and lower headers at the H-shaped joint at positions which are vulnerable to leaks.

At least one rod may extend along the bonded interface between the heat absorber panel and the H-shaped slot in the header pipes at the upper and lower interlocking joints on front and rear sides of the panel.

It is thus a feature of at least one embodiment of the invention to provide increased structural support and prevent leaks along a width of the heat absorber panel at the upper and lower header twin-wall panel interfaces.

The front and rear plates may be rectangular and may have a length between 30 and 300 cm and a width between 30 and 120 cm.

It is thus a feature of at least one embodiment of the invention to provide a panel with a large, sun exposed face capable of receiving heat from the sun and holding a large volume of transfer fluid capable of being heated by the sun.

The front and rear plates may be polycarbonate. The absorbent sun contact surface may be a black paint and the rear plate may be white or other color reflective paint.

It is thus a feature of at least one embodiment of the invention to provide a heat absorber panel that is made of a highly conductive material that can withstand high temperatures.

A length of the upper and lower header may be approximately the same and may be between 40 and 130 cm.

It is thus a feature of at least one embodiment of the invention to provide fluid conduits allowing the transfer fluid to flow to and from the heat absorber panel.

A distance between the front and rear plates may be approximately between 2 mm and 6 mm.

It is thus a feature of at least one embodiment of the invention to spread out the fluid within the panel to a shallow depth increasing heat flow efficiency.

The plurality of channels may support therein various designs of elements configured to produce turbulence in the flow of fluid. The added elements may be a twisted strip or other periodic protrusion structures extending along the channels. These elements would produce turbulence in the flow of fluid through the channels, for example, a high Reynolds number, or that directs the fluid toward the front plate.

It is thus a feature of at least one embodiment of the invention to increase heat transfer efficiency from the heated wall of the channel to the heat transfer fluid by creating turbulent flow of fluid through the channels and increasing the flow time through the channels.

A storage tank may be configured to deliver the transfer fluid to the lower header and receive transfer fluid from the upper header.

It is thus a feature of at least one embodiment of the invention to use the solar heat absorber with a heat exchanger system as known in the art to provide for the storage of heated fluid.

A box enclosure may receive the heat absorber panel wherein the box enclosure has a transparent cover.

It is thus a feature of at least one embodiment of the invention to protect the heat absorber from the natural elements and increasing the warming "greenhouse effect" surrounding the panel.

These particular objects and advantages may apply to only some embodiments falling within the claims and thus do not define the scope of the invention.

DETAILED DESCRIPTION OF THE PREFERRED EMBODIMENT

Figure 1:
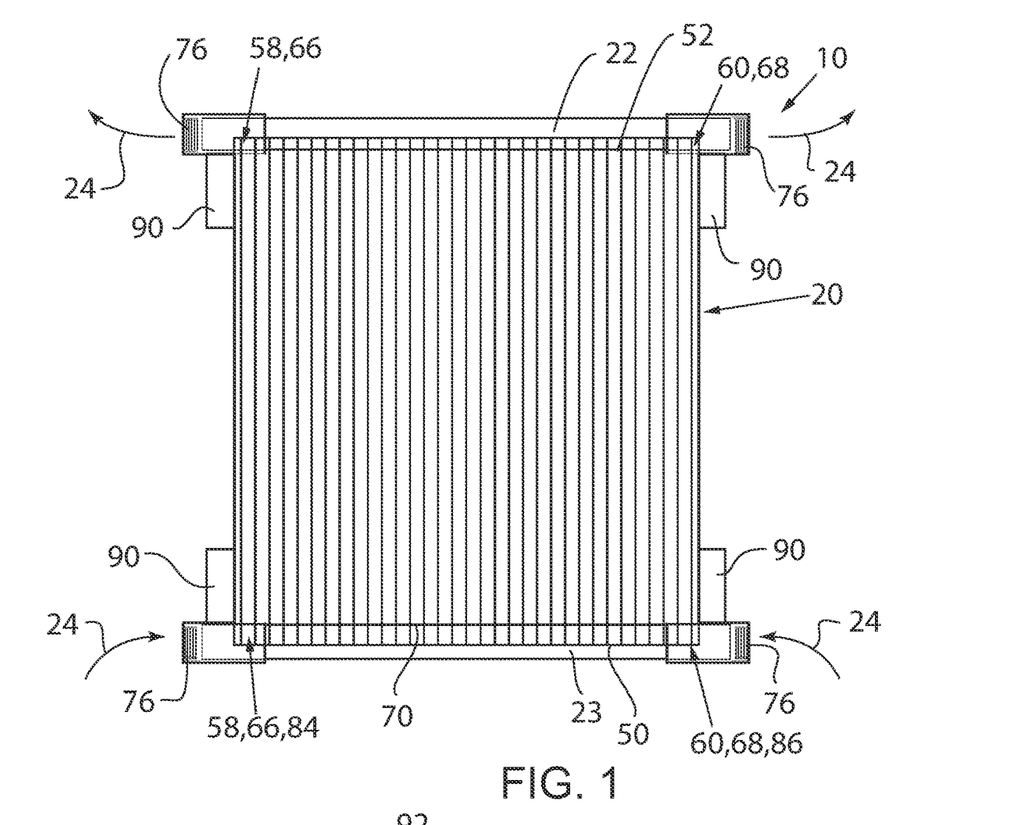
FIG. 1 is a front elevation view of a polycarbonate heat absorber of the present invention having two panes of polycarbonate glazing material connected by longitudinal ribs forming a panel with a plurality of longitudinal water channels and connected at their ends by polycarbonate header pipes.

Referring now to FIG. 1, a flat panel collector 10 of the present invention may be used in connection with a solar water heater system 12, with exemplary solar water heater systems 12 shown in FIG. 5 as further described below.

The flat panel collector 10 may be mounted on a roof or on a tilted rack mounted on the ground in order to absorb and retain heat from the sun and use it to heat a liquid therein. In this respect, the angle of the flat panel collector 10 may be positioned upward or held horizontal to face the sun for the greatest amount of time during the day. In some embodiments, the angle of the flat panel collector 10 may be changed throughout the day, for example, moved manually or by a motor, in order to capture the sun's ray as the sun rises and falls throughout the day.

The flat panel collector 10 may include a heat absorber panel 20 that is flanked at a top end by an upper pipe or header 22 and at a bottom end by a lower pipe or header 23. The upper header 22 is generally positioned vertically higher than the lower header 23 (although it may be at the same vertical height as the lower header 23 if the flat panel collector 10 is held horizontal) and will receive heated heat transfer fluid 24 traveling upward from the heat absorber panel 20 to output or expel the heat transfer fluid 24 at one or both opposed ends of the upper header 22 to a storage tank transferring the heat from the heat transfer fluid 24 to fluid within the storage tank. It is understood that the header heat transfer fluid 24 may also exit the upper header 22 at other exit points besides the ends of the tube, for example, at any point along the length of the upper header 22.

The lower header 23 will receive cooled heat transfer fluid 24 at one or both ends of the lower header 23 from the storage tank and return the cooled fluid back into the heat absorber panel 20 to travel upward through the heat absorber panel 20 to be re-heated again. It is understood that the cooled heat transfer fluid 24 may also enter the lower header 23 at other entry points besides the ends of the tube, for example, at any point along the length of the lower header.

A length of the upper and lower headers 22, 23 may be substantially the same and may be approximately 40 to 130 cm. The upper and lower headers 22, 23 may be slightly longer than a width of the heat absorber panel 20 to extend or protrude outwardly from left and rights sides of the top and bottom of the heat absorber panel 20, for example, protruding 5 to 15 cm outward from the heat absorber panel 20. The outer ends 21 of the upper and lower headers 22, 23 may include pipe threads 25 cut into the inner or outer surfaces of the outer ends 21. The upper and lower headers 22, 23 may have at least one opening permitting the exit and return, respectively, of the heat transfer fluid 24. The opening may be valve controlled.

The heat transfer fluid 24 that flows upward along the heat absorber panel 20 to absorb energy from the sun may be water (used in direct systems) or a non-freezing liquid such as an anti-freeze and water mixture (used in indirect systems) as known in the art.

Figure 2:
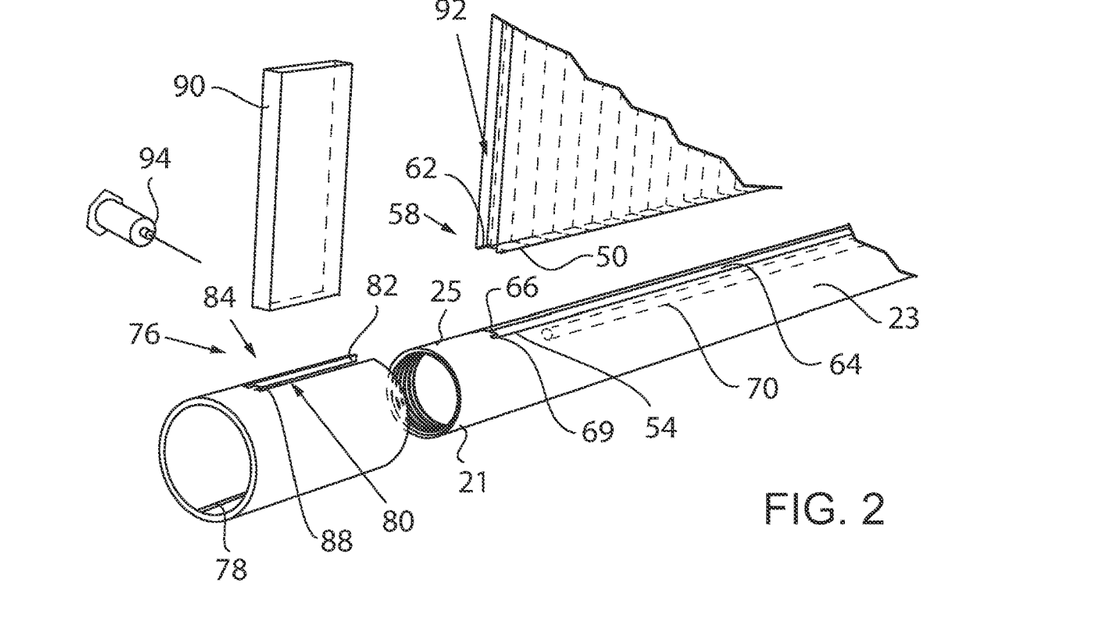
FIG. 2 is an enlarged, exploded perspective view of the polycarbonate heat absorber of FIG. 1 showing the panes attached to the polycarbonate header pipe of a bottom end and a compression collar connected at a left end of the polycarbonate header pipe, an inner surface of the ends of the header pipe having pipe threads.
Figure 3:
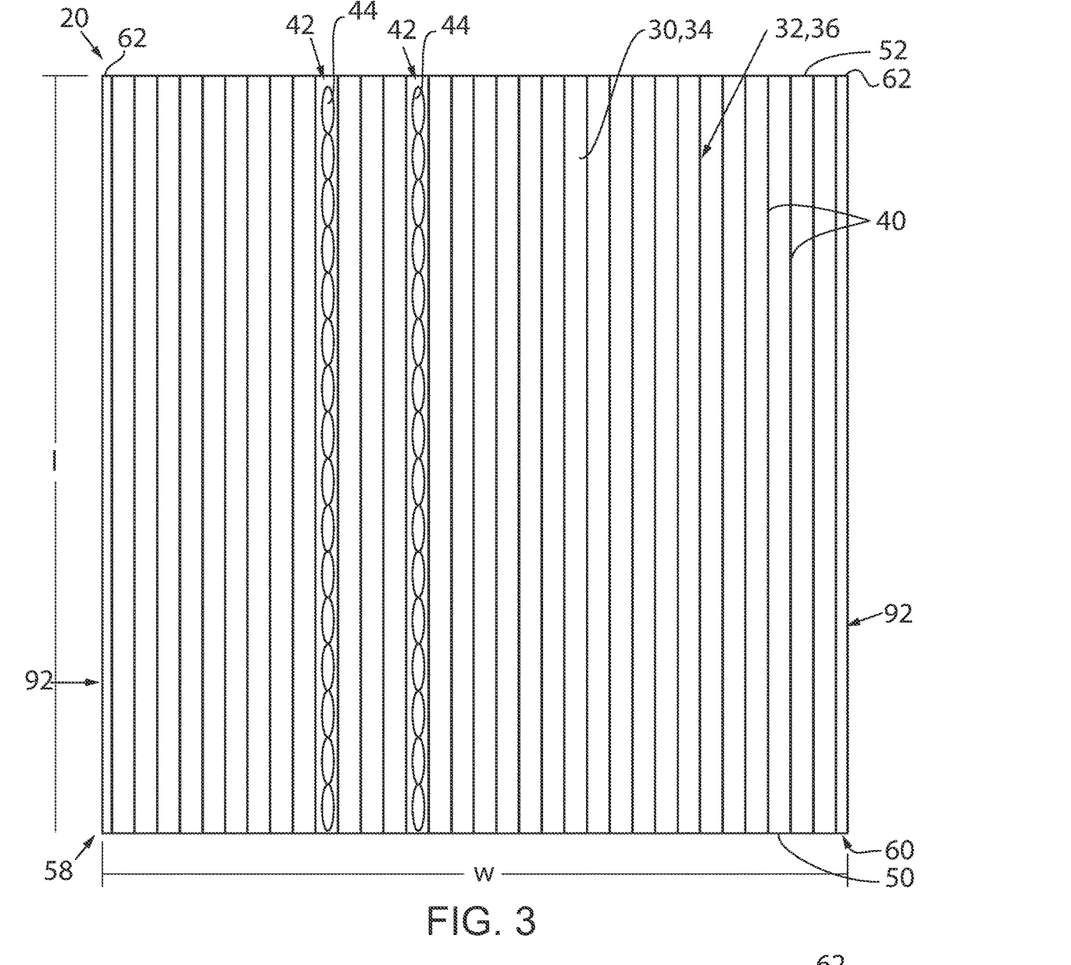
FIG. 3 is a front elevation view (and identically, rear elevation view) of the panel of FIG. 1 showing the twin-walled polycarbonate heat absorber panes with ribs forming longitudinal channels and optionally holding twist inserts.

Referring to FIGS. 2 and 3, the heat absorber panel 20 may be an extruded polycarbonate glazing material that includes a front pane 30 and a rear pane 32 of rectangular, planar sheets of polycarbonate material (i.e., a "twin-walled" polycarbonate panel). The front pane 30 may be oriented to face the sun and the rear pane 32 may be oriented behind or underneath the front panel 30. The front pane 30 and rear pane 32 may have a length (1) extending a distance between the upper and lower headers 22, 23, the length being approximately 30 to 300 cm. A width (w) of the front pane 30 and rear pane 32 extending a distance along the upper and lower headers 22, 23 may be approximately 30 to 120 cm. A thickness of the front pane 30 and rear pane 32, respectively, may be less than 5 mm and may be less than 2 mm and may be about 1 mm. The heat absorber panel 20 may have an overall depth that is approximately 3 mm to 10 mm and less than 10 mm and less than 7 mm and less than 5 mm and may be about 6 mm and about 5 mm and about 4 mm. The extruded polycarbonate glazing material may be of a type sold by AmeriLux International of De Pere, WI.

In some embodiments, the heat absorber panel 20, and the front pane 30 and rear pane 32, may have a shorter length, for example between 15 to 150 cm and about 86 cm, but may be arranged in series in order to mimic the length of longer heat absorber panels 20, with the front pane 30 and rear pane 32 having a longer length, for example between 30 to 300 cm and about 172 cm. When more than one heat absorber panels 20 are arranged in series, the heat transfer fluid 24 exiting the upper header 22 of a first heat absorber panel 20 will flow to the lower header 23 of a second heat absorber panel 20. Therefore, the heat transfer fluid 24 will travel through more than one heat absorber panels 20 to mimic the length of a longer heat absorber panel 20. It is understood that it may be desirable for the total length of a longer heat absorber panel 20 or multiple shorter heat absorber panels coupled together to be at least 150 cm and at least 160 cm and at least 170 cm.

The front pane 30 and rear pane 32 may be nearly identical except for the front pane 30 having an absorbent sun contact surface 34 that will assist with absorbing as much sunlight as possible. The absorbent sun contact surface 34 may be created by coating the outer surface with a selective absorber material that has high visible light absorption and low infrared (IR) emittance. In one embodiment, the coating is a black paint, for example, commercially available Rust-Oleum, or SOLKOTE HI/SORB-II protective enamel flat black paint having an emissivity of at least 0.94. In addition, a low IR emissivity paint may be sprayed on an inner surface of the front panel 30, opposite the absorbent sun contact surface 34, to reduce the emission of IR once the absorber panel heats up and may be, for example, commercially available LO/MIT. It is understood that other dark colors besides black paint and other absorbent coating materials may also be used to create the absorbent sun contact surface 34 as understood in the art.

The rear pane 32, instead of having the absorbent sun contact surface 34, may include on its outer surface a reflective lower surface 36 that assists with reflecting infrared light back into the heat absorber panel 20. The reflective lower surface 36 may be painted with white gloss which reflects light instead of absorbing light. It is understood that other colors besides white paint and other reflective coating materials may be used to reflect light back into the heat absorber panel 20 as understood in the art.

The front pane 30 and the rear pane 32 may be joined by a plurality of longitudinal ribs 40 extending between the front pane 30 and rear pane 32. Each of the plurality of ribs 40 may be a narrow strip of rectangular polycarbonate material having a length extending longitudinally along the length of the front pane 30 and rear pane 32. The length of each of the plurality of ribs 40 may be approximately equal to the length of the front pane 30 and rear pane 32, therefore, the length of each of the plurality of ribs 40 may be approximately 30 to 300 cm. A width of each of the plurality of ribs 40 may extend between the front pane 30 and the rear pane 32. It is understood that the width of each of the ribs 40 may be approximately equal to a space between the inner surfaces of the front pane 30 and rear pane 32. The width of each of the ribs 40 may be approximately 3 mm to 6 mm and may be about 4 mm and therefore a depth (d) of the heat absorber panel 20 may be similar (or slightly larger to include the thickness of the front pane 30 and rear pane 32). The depth (d) of the heat absorber panel 20 may be approximately 3 mm to 10 mm and less than 10 mm and less than 7 mm and less than 5 mm and may be about 6 mm and about 5 mm and about 4 mm.

It is understood that the efficiency of the heat absorber panel 20 may depend on a combination of the intensity of sunlight, water flow speed through the heat absorber panel 20/water channels, and the depth of the heat absorber panel 20/water channels. The efficiency of the heat absorber panel 20 increases as the depth of the heat absorber panel 20/water channels decreases, however, depths below 4 mm may increase the resistance to water flow.

The plurality of ribs 40 may be spaced apart equally along the width of the front pane 30 and rear pane 32. The plurality of ribs 40 may be spaced along substantially a full width of the front pane 30 and rear pane 32. Any number of ribs 40 may be positioned along the full width of the front pane 30 and rear pane 32 for example, there may be between 20 to 100 ribs depending on the width of the heat absorber panel 20 with a rib spacing of approximately 1 to 4 cm between ribs 40.

The plurality of ribs 40 may form a plurality of corresponding fluid channels 42 between each pair of adjacent ribs 40 allowing the heat transfer fluid 24 to flow therethrough. The fluid channels 42 may provide rectangular conduits and may be generally rectangular in cross section. The fluid channels 42 may have a width commensurate with the rib spacing between adjacent ribs 40, a depth that is commensurate with the width of each rib 40 and the distance between an inner surface of the front pane 30 and the rear pane 32, and a length that is commensurate with the length of each rib 40 and the length of the front pane 30 and rear pane 32.

It is understood that in some embodiments the front pane 30, rear pane 32 and plurality of ribs 40 may be coextruded to form a unitary heat absorber panel 20 promoting the strength of the heat absorber panel 20.

Each of the fluid channels 42 may support a turbulence making element such as twisted strips 44 (two exemplary twisted strips 44 shown in FIG. 3) and the like that extend longitudinally within the water channel 42 along the length of the water channel 42. The twisted strips 44 may be rectangular strips of polycarbonate material twisted into a helix or spiral. The twisted strips 44 may be used to produce turbulent fluid flow (e.g., high Reynolds number) of the heat transfer fluid 24 within the fluid channels 42 useful for increasing the efficiency of heat transfer between the front pane 30 and rear pane 32 and the heat transfer fluid 24. In one embodiment, the twisted strips 44 create obstructions in the fluid channels 42 that preferentially directs the heat transfer fluid 24 flow toward the absorbent sun contact surface 34. The twisted strips 44 may extend substantially a full length of the fluid channels 42 and may have an outer diameter that is close to being inscribed or enclosed to "fit snugly" within the fluid channels 42. A length of the twisted strips 44 may be approximately 30 to 300 cm.

Figure 6:
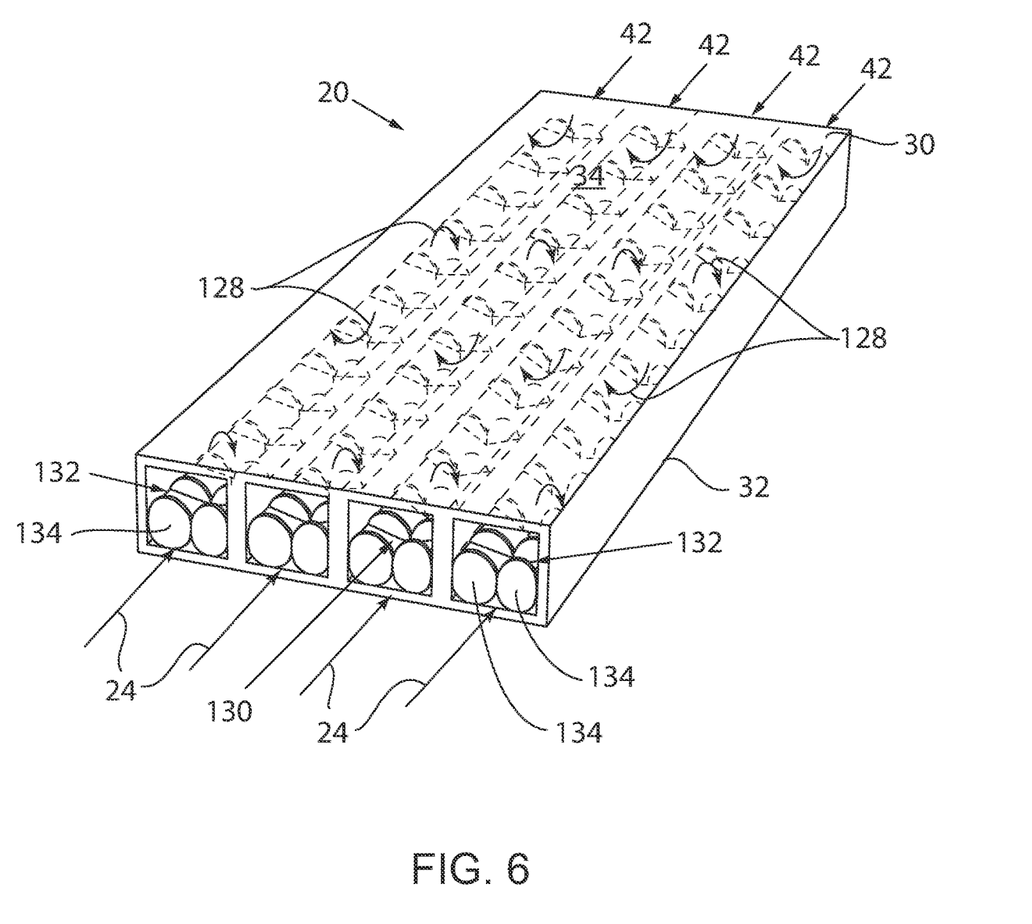
FIG. 6 is a perspective view of an alternative embodiment of the present invention showing the twin-walled polycarbonate heat absorber panes supporting turbulence creating inserts with a bladed pattern.

Referring to FIG. 6, one embodiment of the present invention contemplates that thermal energy will conduct from the absorbent sun contact surface 34 heated by the sun through the front wall 30 of the heat absorber panel 20 to the heat transfer fluid 24 flowing through the rectangular channels 42 of the heat absorber panel 20. The dimensions of the rectangular fluid channels 42 naturally support smooth laminar flow. Friction between the walls of the fluid channels 42 and the heat transfer fluid 24 produce a lower flow speed along the channel walls and a faster flow speed in the center of the channel 42. Because the transfer fluid 24 flowing along the front wall 30 is at a lower flow speed, this undesirably increases the highest temperature transfer fluid 24 contacting the front wall 30 and reduces the rate of thermal energy transfer between the front wall 30 absorbent sun contact surface 34 and the transfer fluid 24.

To increase the rate of thermal energy transfer, it is desirable that a turbulence 128 is created in the transfer fluid 24 flowing through the fluid channels 42. For example, a bladed-pattern 130, similar to vortex generators along the leading edge of aircraft wings, creates turbulence in the transfer fluid 24 flowing through the fluid channels 42 which increases the efficiency of thermal energy transfer from the front wall 30 absorbent sun contact surface 34 to the transfer fluid 24 flowing through the heat absorber panel 20.

In one embodiment, the blade pattern 130 is created by, e.g., cutting 1 mm angled grooves 132 in the surface of 2 cm polycarbonate rods 134. The grooved rods 134 are bonded together inside the fluid channels 42, for example, two grooved rods 134 per fluid channel 42 with the grooves 132 angled inwardly toward each other, to provide the turbulence necessary to increase the thermal energy gathering efficiency of the absorber panel 20. In addition, reducing the transfer fluid 24 inside the fluid channels 42 reduces the weight of the absorber panel 20 and thus reduces mechanical stresses on the absorber panel 20. Referring to FIGS. 1 and 2, the heat absorber panel 20 may be connected and sealed to the upper header 22 and lower header 23 to allow cool heat transfer fluid 24 to flow from the lower header 23 into a lower end 50 of the heat absorber panel 20, and to allow heated heat transfer fluid 24 to flow from an upper end 52 of the heat absorber panel 20 to the upper header 22. The upper end 52 and lower end 50 of the heat absorber panel 20 may be connected to the upper header 22 and lower header 23, respectively, by inserting the upper end 52 and lower end 50 of the heat absorber panel 20 into a corresponding tube H-slot 54 of the upper and lower headers 22, 23.

Figure 4:
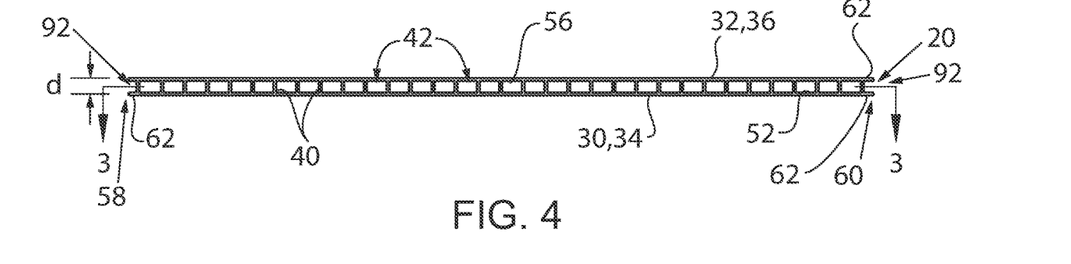
FIG. 4 is a top plan view (and identically, bottom plan view) of the polycarbonate heat absorber of FIG. 1 showing the twin-walled polycarbonate heat absorber panel with longitudinal channels and winged edge extensions of the panel receiving the header pipe of FIG. 2.

Referring briefly to FIG. 4, the upper end 52 and lower end 50 of the heat absorber panel 20 form a cross section that includes a rectangular grid 56 or cells of the fluid channels 42 with opposed left and right ends 58, 60 of the rectangular grid 56 having forked extensions 62 formed by the front pane 30 and rear pane 32 extending outwardly in left and right directions, respectively, from the nearest rib 40. The forked extensions 62 may extend approximately 0.1 to 1 cm.

Referring again to FIGS. 1 and 2, the heat absorber panel 20 is received by the upper and lower headers 22, 23 to form a sealing compression fit with the upper and lower headers 22, 23. The upper end 52 and lower end 50 of the heat absorber panel 20 are received into a tube H-slot 54 of the upper and lower headers 22, 23, respectively. The tube H-slot 54 provides a rectangular slot 64 corresponding with the size of the rectangular grid 56 to receive the rectangular grid 56 of the heat absorber panel 20. The rectangular slot 64 also has opposed left and right ends 66, 68 that have forked slots 69 (at ends of the H-shaped slot), respectively, that receive the forked extensions 62 of the opposed left and right ends 58, 60, respectively, of the heat absorber panel 20. In this respect the upper end 52 and lower end 50 of the heat absorber panel 20 are fitted within the tube H-slot 54 of the upper and lower headers 22, 23, respectively, to form an interlocking engagement.

A rod 70 may be used between the interface of the heat absorber panel 20 and the upper and lower headers 22, 23 to seal the connection. The rod 70 may be a round polycarbonate rod, for example, with a diameter of between 1 to 5 cm and about 2 cm, and bonded to the heat absorber panel 20, upper and lower headers 22, 23, and a compression collar 76 as described further below. The rod 70 may extend along the front side 34 and rear side 36 of the heat absorber panel 20 above and/or below the tube H-slot 54 to prevent leaks at the interface of the heat absorber panel 20 and the upper and lower headers 22, 23. In one embodiment, the rod 70 may extend along the front side 34 and rear side 36 of the heat absorber panel 20, on the inside of the upper and lower headers 22, 23 directly below the tube H-slot 54. It is understood that multiple rods 70, for example, two, three or four rods 70, may be placed at the interfaces between the heat absorber panel 20 and the tube H-slot 54 in order to prevent leaks and to bond the heat absorber panel 20, upper and lower headers 22, 23, and a compression collar 76 (described below) together. The rod 70 may be installed and bonded after the heat absorber panel 20, upper and lower headers 22, 23, and a compression collar 76 are compression fitted together.

A compression collar 76 may be used to help seal the connection of the heat absorber panel 20 and the upper and lower headers 22, 23 and to increase the strength of the bond between the upper and lower headers 22, 23 and the flat panel collector 10 at the forked slots 69 at opposed left and right ends 66, 68. The compression collar 76 may be used at the outer ends of the upper and lower headers 22, 23 at both the upper and lower ends 52, 50 of the heat absorber panel 20.

The compression collar 76 may be a cylindrical tube having a longitudinal slit 78 extending along a length of the compression collar 76 allowing the circumference of the compression collar 76 to expand and compress slightly. Opposite the longitudinal slit 78 is a collar H-slot 80 which matches the end of the tube H-slot 54 of the upper and lower headers 22, 23. The collar H-slot 80 is generally a rectangular slot 82 corresponding with and receiving the opposed left and right ends 58, 60 of the rectangular grid 56 of the heat absorber panel 20. The rectangular slot 82 has opposed left and right ends 84, 86 that have forked slots 88 that receive the forked extensions 62 of the heat absorber panel 20. In this respect, the compression collar 76 overlaps the tube H-slot 54 and assists with creating a snug compression fit between the heat absorber panel 20 and the upper and lower headers 22, 23 by compressing the tube H-slot 54 around the upper and lower ends 52, 50 of the heat absorber panel 20.

A spacer block 90 may be inserted between the forked extensions 62 forming an open U-channel 92 at the opposed left and right ends 58, 60 of the rectangular grid 56 at both the upper and lower ends 52, 50 of the heat absorber panel 20. The spacer block 90 may have a depth that is approximately commensurate to the distance between the front pane 30 and rear pane 32 which is approximately 1 to 10 cm, a width that is approximately 2 to 5 cm and about 2.5 cm, and a length that is approximately 5 to 15 cm. The spacer block 90 slides into the open U-channel 92, resting on the compression collar 76, and may be held in place by an adhesive. The spacer block 90 strengthens the bond between the upper and lower headers 22, 23 and the heat absorber panel 20 by providing support to the outer lateral extensions of the upper and lower headers 22, 23. In particular, the opposed left and right ends 66, 68 of the rectangular slot 64 is vulnerable to breakage due to flexure of the upper and lower headers 22, 23 and heat absorber panel 20 and therefore the spacer block 90 provides additional support. In some embodiments, the spacer block 90 may be used to help hold the heat absorber panel 20 in position within a box enclosure 99 as described below.

In use, the compression collar 76 may be slid onto the ends of the upper and lower headers 22, 23 so that the collar H-slot 80 overlaps the tube H-slot 54 to compress the upper and lower ends 52, 50 of the heat absorber panel 20 inward against the forked slots 69 of the tube H-slot 54. The spacer block 90 may then be inserted into the U-channel 92 to press the forked extensions 62 outward against the forked slots 69 of the tube H-slot 54. Thus, a tight compression of the tube H-slot 54 around the upper and lower ends 52, 50 of the heat absorber panel 20 is created. Then, the rod 70 may be positioned at the interfaces between the absorber panel 20, upper and lower headers 22, 23, and compression collar 76.

Next, the polycarbonate adhesive 94 is applied to produce a strong bond between the absorber panel 20, upper and lower headers 22, 23, and compression collar 76. The rod 70 is also bonded to the respective parts using the polycarbonate adhesive 94. The spacer block 90 may assist with applying the bonding polycarbonate adhesive 94 into the inner surfaces of the H-slot 54.

Referring to FIG. 5, the heat absorber panel 20 as described above can be optionally incorporated into an enclosure 99, for example, constructed of aluminum with a transparent window of tempered glass or polycarbonate panel material. In an alternative embodiment, the enclosure 99 is constructed entirely or mostly of polycarbonate panels or walls. The enclosure 99 may include a glass or polycarbonate transparent cover with a back panel or insulated back panel. In this respect, the heat absorber panel 20 may be protected from the elements while still allowing the sun's energy to be absorbed by the heat absorber panel 20. Insulation of the enclosure 99 will assist with retaining the heat absorbed by the heat absorber panel 20. The glass cover of the enclosure 99 may also increase the heating and temperature ("greenhouse effect") within the box. However, it is understood that the heat absorber panel 20 described above may be used without the enclosure 99.

The heat absorber panel 20 may be able to withstand high internal pressures, for example, at least 100 psi for at least one hour and at above 90 degrees Celsius (194 degrees Fahrenheit). The heat transfer fluid 24 may be below boiling temperature when within the heat absorber panel 20 to prevent ruptures. The heat absorber panel 20 must also stay below a certain temperature when in direct sunlight so that the heat absorber panel 20 does not warp or deform. The heat absorber panel 20 should also be able to withstand thermal shocks or extreme temperature changes and be able to withstand multiple freezing and thaw cycles.

Figure 5A:
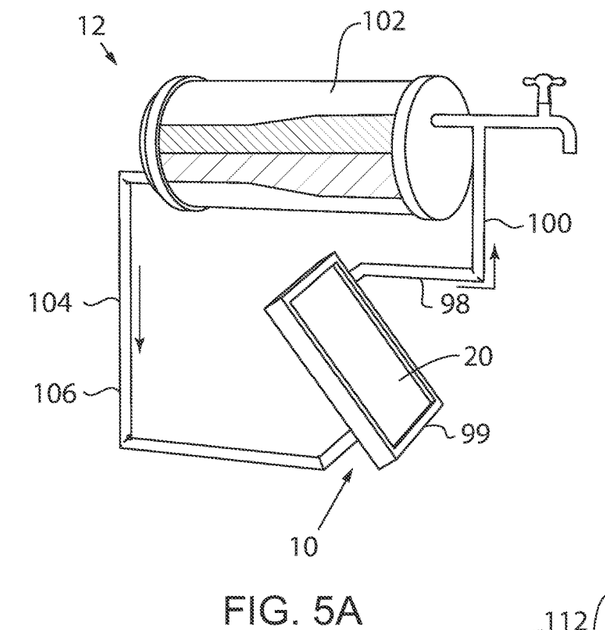
FIGS. 5A and 5B are schematics of the polycarbonate heat absorber being used within a (A) direct heat transfer system and (B) indirect heat transfer system to heat water within a water tank in accordance with the present invention.
Figure 5B:
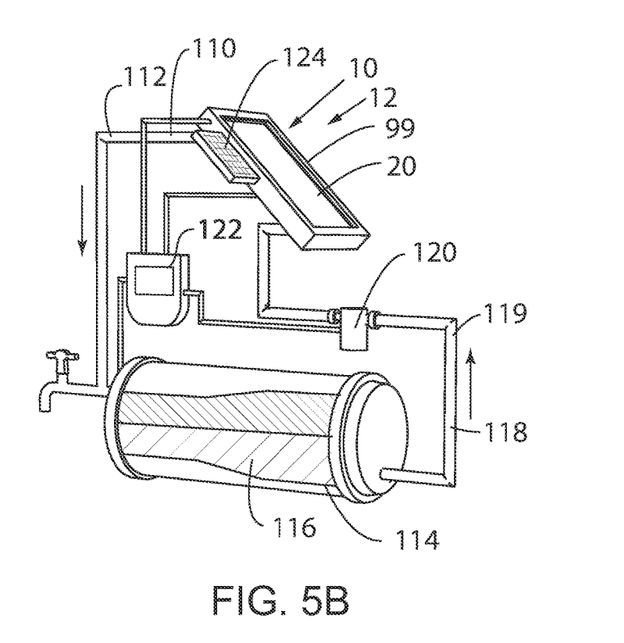

As seen in FIGS. 5A and 5B, the flat panel collector 10 may be used within a solar water heater system 12 that is a passive direct system or an active indirect system as described below and as generally known in the art.

Referring to FIG. 5A, a direct system may circulate the heat transfer fluid 24, which in this embodiment is water, through the heat absorber panel 20 where it is heated by the sun. As water flows upward through the fluid channels 42 of the heat absorber panel 20, it is heated by the sun, and then heated water 98 flows outward from the fluid channels 42 at the upper end 52 of the heat absorber panel 20 into the upper header 22. The heated water 98 exits the upper header 22 through at least one of the ends of the upper header 22. The upper header 22 and compression collar 76 are coupled to at least one tube or pipe 100 which carries the heated water 98 away from the flat panel collector 10 and to a storage tank 102. The heated water 98 is then stored in the storage tank 102, sent to a tankless water heater, or used directly. Cooled return water 104 flows back into the flat panel collector 10 through at least one return tube or pipe 106 where the process is repeated. These direct systems may be preferred in climates where the water will not freeze. Otherwise, freeze protection will be needed in colder climates.

In passive direct systems, pumps are not used, and natural convection moves the water upward through the heat absorber panel 20 and to the storage tank 102. As the water is heated in the heat absorber panel 20, less dense hot water rises to flow upward into the upper header 22.

Referring to FIG. 5B, an indirect system may circulate the heat transfer fluid 24, which is a non-freezing liquid such as a mix of antifreeze and water, through the heat absorber panel 20 where it is heated by the sun. As the mixture fluid flows upward through the fluid channels 42 of the heat absorber panel 20, it is heated by the sun, and then the heated fluid 110 flows outward from the fluid channels 42 at the upper end 52 of the heat absorber panel 20 into the upper header 22. The heated fluid 110 exits the upper header 22 through at least one of the ends of the upper header 22. The upper header 22 and compression collar 76 are coupled to at least one tube or pipe 112 which carries the heated fluid 110 away from the flat panel collector 10 and to a storage tank 114. The heated fluid 110 passes through a heat exchanger 116 in the storage tank 114, transferring heat to the water in the storage tank 114. The non-freezing liquid 118 then circulates back to the flat panel collector 10 through at least one return tube or pipe 119 where the process is repeated. These indirect systems may be preferred in freezing climates where water would freeze.

In active or forced circulation systems, electric pumps 120, valves and controllers 122 are used to move the heat transfer fluid 24 through the heat absorber panel 20 and to the storage tank 114. The controllers 122 may be used to control the operation of the electric pumps 120 and opening and closing of valves and may be powered by a photovoltaic module 124 or panel and the like.

Certain terminology is used herein for purposes of reference only, and thus is not intended to be limiting. For example, terms such as "upper," "lower," "above," and "below," refer to directions in the drawings to which reference is made. Terms such as "front," "back," "rear," "bottom," and "side," describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second," and other such numerical terms referring to structures do not imply a sequence or order unless clearly indicated by the context.

When introducing elements or features of the present disclosure and the exemplary embodiments, the articles "a," "an," "the," and "said," are intended to mean that there are one or more of such elements or features. The terms "comprising", "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A solar heat absorber for absorbing heat and transferring heat from a sun to a heat exchanger comprising:
    a heat absorber panel having
        front and rear plates wherein the front plate supports an absorbent sun contact surface;
        a plurality of ribs extending between the front and rear plates and forming longitudinal channels extending along a longitudinal axis flanked by the front and rear plates wherein the plurality of channels permits a flow of fluid along the longitudinal axis;
    an upper header communicating with the heat absorber panel and configured to receive fluid from the plurality of channels wherein a connection between the upper header and the heat absorber panel is an upper interlocking joint; and
    a lower header positioned below the upper header and communicating with the heat absorber panel and configured to transfer fluid to the plurality of channels wherein a connection between the lower header and the heat absorber panel is a lower interlocking joint;
    wherein the upper and lower header have slots receiving upper and lower edges, respectively, of the heat absorber panel;
    wherein the plurality of longitudinal channels hold blocking elements configured to produce turbulence in the flow of fluid; and
    wherein the blocking element produces a turbulence in the flow of fluid that preferentially directs the fluid toward the front plate.

2. The solar heat absorber of claim 1 further comprising a pair of lateral collars extending over outer ends of the upper header and lower header, respectively, the pair of lateral collars providing H-shaped slots receiving longitudinally extending flanges from the heat absorber panel.

3. A solar heat absorber for absorbing heat and transferring heat from a sun to a heat exchanger comprising:
    a heat absorber panel having
        front and rear plates wherein the front plate supports an absorbent sun contact surface;
        a plurality of ribs extending between the front and rear plates and forming longitudinal channels extending along a longitudinal axis flanked by the front and rear plates wherein the plurality of channels permits a flow of fluid along the longitudinal axis;
    an upper header communicating with the heat absorber panel and configured to receive fluid from the plurality of channels wherein a connection between the upper header and the heat absorber panel is an upper interlocking joint; and
    a lower header positioned below the upper header and communicating with the heat absorber panel and configured to transfer fluid to the plurality of channels wherein a connection between the lower header and the heat absorber panel is a lower interlocking joint;

wherein the upper and lower header have slots receiving upper and lower edges, respectively, of the heat absorber panel; and further comprising at least one spacer block positioned within a channel of the plurality of channels positioned at outer edges of the heat absorber panel.

4. The solar heat absorber of claim 2 wherein the upper and lower interlocking joint is sealed using a polycarbonate adhesive.

5. The solar heat absorber of claim 2 further comprising at least one sealing rod extending along the H-shaped slot at the upper and lower interlocking joint.

6. The solar heat absorber of claim 1 wherein the front and rear plates are rectangular.

7. The solar heat absorber of claim 6 wherein the front and rear plates have a length between 30 and 300 cm and a width between 30 and 120 cm.

8. The solar heat absorber of claim 1 wherein the front and rear plates are polycarbonate.

9. The solar heat absorber of claim 8 wherein the absorbent sun contact surface is a black paint.

10. The solar heat absorber of claim 1 wherein a length of the upper and lower header is between 40 and 130 cm.

11. The solar heat absorber of claim 1 wherein a distance between the front and rear plates is approximately between 2 mm and 6 mm.

12. The solar heat absorber of claim 3 wherein the plurality of channels supports therein a blocking element configured to produce turbulence in the flow of fluid.

13. The solar heat absorber of claim 12 wherein the blocking element is a twisted strip.

14. The solar heat absorber of claim 3 wherein the blocking element produces a turbulence in the flow of fluid that preferentially directs the fluid toward the front plate.

15. The solar heat absorber of claim 1 further comprising a storage tank configured to deliver the transfer fluid to the lower header and receive transfer fluid from the upper header.

16. The solar heat absorber of claim 1 further comprising a box enclosure receiving the heat absorber panel wherein the box enclosure has a transparent cover.

17. A method of absorbing heat and transferring heat from a sun to a heat exchanger comprising:

providing a heat absorber panel having front and rear plates wherein the front plate supports an absorbent sun contact surface, and a plurality of ribs extending between the front and rear plates and forming longitudinal channels extending along a longitudinal axis flanked by the front and rear plates wherein the plurality of channels permits a flow of fluid along the longitudinal axis;

inserting into at least some of the longitudinal channels blocking element configured to produce turbulence in the flow of fluid that preferentially directs the fluid toward the front plate;

attaching an upper header to the heat absorber panel, the upper header configured to receive fluid from the plurality of channels wherein a connection between the upper header and the heat absorber panel is an upper interlocking joint;

attaching a lower header to the heat absorber panel, the lower header configured to transfer fluid to the plurality of channels wherein a connection between the lower header and the heat absorber panel is a lower interlocking joint;

wherein the upper and lower header support slots receiving upper and lower edges, respectively, of the heat absorber panel;

positioning the upper header above the lower header; and positioning the heat absorber panel in direct contact with heat from the sun.

\* \* \* \* \*